US008191054B2

(12) United States Patent
Kilbane et al.

(10) Patent No.: US 8,191,054 B2
(45) Date of Patent: May 29, 2012

(54) PROCESS FOR HANDLING SHARED REFERENCES TO PRIVATE DATA

(75) Inventors: Stephen M. Kilbane, Edinburgh (GB); Alexander Raikman, Mansfield, MA (US)

(73) Assignee: Analog Devices, Inc., Norwood, MA (US)

( * ) Notice: Subject to any disclaimer, the term of this patent is extended or adjusted under 35 U.S.C. 154(b) by 1533 days.

(21) Appl. No.: 11/584,183

(22) Filed: Oct. 20, 2006

(65) Prior Publication Data

US 2008/0098179 A1    Apr. 24, 2008

(51) Int. Cl.
*G06F 9/45* (2006.01)
(52) U.S. Cl. ..................... 717/149
(58) Field of Classification Search .............. 717/120, 717/140, 105, 159, 116, 162, 149, 156; 712/10; 711/133, 141; 714/4; 719/315
See application file for complete search history.

(56) References Cited

U.S. PATENT DOCUMENTS

| | | | |
|---|---|---|---|
| 6,487,713 B1 * | 11/2002 | Cohen et al. | 717/105 |
| 6,993,770 B1 * | 1/2006 | Detlefs et al. | 719/315 |
| 7,178,139 B2 * | 2/2007 | Linke et al. | 717/162 |
| 2004/0064656 A1 * | 4/2004 | Hangal et al. | 711/154 |
| 2004/0083455 A1 * | 4/2004 | Gschwind et al. | 717/120 |
| 2007/0083730 A1 * | 4/2007 | Vorbach et al. | 712/10 |

OTHER PUBLICATIONS

"a.out(5), FreeBSD File Formats Manual," Mar. 16, 2007, 6 pages, Panagiotis, Christias. Mar. 16, 2007 <http://fuse4bsd.creo.hu/localcgi/man-cgi.cgi?a.out+5>.
"Common Object File Format (COFF)," 2007, 3 pages, Microsoft Corporation. Mar. 16, 2007 <http://support.microsoft.com/kb/121460>.
Tool Interface Standards (TIS), Executable and Linking Format (ELF) Specification, May 1995, 106 pages, TIS Committee, Version 1.2.
Bourne, S.R., "The Unix System," 1982, p. 244, Bell Telephone Laboratories, Inc., New Jersey, USA.
Welsh, Matt, et al., "Running Linux," 1999, p. 374, 3rd Edition, O'Reilly & Associates, Sebastopol, CA, USA.
Van Der Linden, Peter, "Expert C Programming, Deep C Secrets" 1994, p. 117, Prentice Hall, Englewood Cliffs, NJ, USA.
Aho, Alfred V., et al., "Compilers: Priciples, Techniques, & Tools," 2007, p. 19, 2nd Edition, Pearson Eduction, Inc., Boston, MA, USA.
Muchnick, Steven S., "Advanced Compiler Design Implementation," 1997, p. 127-131, Morgan Kaufmann Publishers, San Francisco, CA USA.
Tanenbaum, Andrew S., et al., "Operating Systems: Design and Implementation," 2006, p. 383-396, 3rd Edition, Prentice-Hall, Inc., Upper Saddle River, NJ, USA.
Van Der Linden, Peter, "Expert C Programming, Deep C Secrets" 1994, p. 110, Prentice Hall, Englewood Cliffs, NJ, USA.

* cited by examiner

*Primary Examiner* — Tuan Anh Vu
(74) *Attorney, Agent, or Firm* — Bingham McCutchen LLP

(57) ABSTRACT

Methods and apparatus are provided for a linker to resolve references from shared memory to private memory in a multicore system.

15 Claims, 6 Drawing Sheets

PROCESS FOR HANDLING SHARED REFERENCES TO PRIVATE DATA

BACKGROUND OF INVENTION

1. Field of Invention

This invention relates to linkers and, more particularly, to methods and apparatus for resolving symbol references in multi-core architectures.

2. Background of the Invention

Modern software is often developed in a modular fashion, using a combination of custom code written for the particular application and generic code that may be used in many applications. Reusable modules are often packaged in libraries and distributed either in source code or object code format. In the source code, software in one module calls components of another module through symbolic references. For example, an application that performs digital signal processing might call a standard Fast Fourier Transform component of a standard module by calling the component by its function name in the source code, e.g., fft( ).

The process of building a final executable application from individual source code files involves several steps, which are usually performed by a set of programmer tools designed for that purpose. Source code files are typically compiled into object files individually, and then combined by a linker to make a single executable binary. The linker performs at least two separate functions. First, the linker must satisfy references that are undefined within a source code module. In the example above, if the source code to the digital signal processing application calls the fft( ) function, the linker must satisfy that symbolic reference by locating a suitable definition of the function in one of the other modules involved in the linking process. In effect, the linker must match the definition of a symbol to all the uses of that symbol elsewhere in the source code. If a symbol is referenced but is not defined anywhere else in the source code, the linker may signal the user with a warning or error message that it was unable to resolve the symbolic reference.

Second, the linker must resolve symbols to memory addresses. After identifying and resolving all of the required components, the linker must arrange those components within the memory space of the application. Each component is given a memory address. As in the example above, the fft( ) function could be given a memory address of 0x1000. Once all of the components are given memory addresses, the linker converts all of the symbolic references within the application into those memory addresses so the application can be executed by a CPU. In the fft( ) example, each symbolic reference to the function fft( ) could be resolved to reference the memory address 0x1000. FIG. 1 illustrates the process of compiling source code, resolving symbolic references, and linking into an executable image file.

Linking can be static or dynamic. A static linker bundles a component together with the components it references, as well as all components referenced by those components, until all of the necessary modules are contained in a single executable. Static linking allows the developer to distribute a single binary without needing to ensure that other dependencies already exist on a target system. Static linking, in some cases, also results in performance gains. On the other hand, static linking may require more memory and disk space than dynamic linking. Dynamic linking means that the data in a library is not copied into a new executable or library at compile time, but remains in a separate file on disk. In this case, the linker only records what libraries are required when the application is compiled and the tasks of satisfying undefined references and resolving symbols to memory addresses is done when the application is executed (i.e., at runtime). Dynamic linking allows the same library to be used by multiple applications, thereby conserving disk space and potentially memory.

A computer processor typically has some memory on-chip with the processor and other memory off-chip. The on-chip memory is generally faster but more expensive memory, while the off-chip memory is cheaper, slower, and can be very large in size. These memory stores can be divided further. For example, it is common to have two levels of on-chip memory. Some models of Analog Devices, Inc.'s Blackfin processors have a memory hierarchy as depicted in FIG. 2, where L1 and L2 memory are physically located on the chip with the CPU, while L3 memory is external to the CPU. Ideally, code and data that are most often used by the CPU would be stored in the fastest L1 memory, closest to the CPU. Code and data used less often would be stored in L2 memory, and code and data used the least for a given application would be stored in L3 memory for optimal performance. By locating code and data at various memory locations, a linker can assist in optimizing performance and resource use according to these parameters.

As computers have developed to become faster and more efficient, various technologies have been developed to execute separate instructions on more than one processor simultaneously. One common approach is to connect two or more separate CPUs on a single computer motherboard, often referred to as "symmetric multiprocessing," or SMP. Another approach is known as "multi-core," in which two or more independent processors are combined in a single package, often on the same integrated circuit. A multi-core approach can be particularly advantageous over a multiprocessor approach where physical space is more limited, for example, in an embedded device such as a cell phone or a digital video recorder. Some Blackfin processors incorporate multiple cores in a single unit. Other chip manufacturers such as Intel and AMD also make multi-core CPUs.

In a multi-core architecture, there are often memory areas that are private to each core as well as other memory areas that are shared between the cores but still within the processor unit and not part of main memory. By keeping data in a cache close to the processor that is using it, a multi-core system can achieve better performance and more efficient use of resources. Both the private and shared memory can be accessed using a single, unified address-space. For example, a dual core system with cores A and B could have private memory space A and B respectively, as well as a shared memory space C, as illustrated in the following table:

| Memory Space | Address | Private/Shared |
| --- | --- | --- |
| A | 0x001–0x100 | Private to Core A |
| B | 0x101–0x200 | Private to Core B |
| C | 0x201–0x300 | Accessible to both Core A and Core B |

A graphical depiction of the relationship between the two cores A and B and three memory spaces A, B, and C is shown in FIG. 3. These memory areas could correspond to the L1, L2, and L3 memory areas discussed above. For example, both Core A and Core B might have its own L1 memory cache. The L2 memory cache could be shared between the two cores, and the L3 memory area could be outside the CPU, connected by a bus.

All three memory spaces, A, B, and C, each occupy different, nonoverlapping address ranges, so any single given address may be part of only one of the three possible memory spaces. In other words, $end_c < start_b$ and $end_b < start_a$.

Since memory spaces A and B are private to each respective core, it is possible for both memory space A and memory space B to contain objects which have the same symbol name. For example, there may be two functions y and z, which are mapped to shared and private memory respectively. Only one instance of function y is needed, since the instance in shared memory space C is accessible from both Core A and Core B. Two instances of function z are needed for the function to be accessed from both cores, because Core A cannot access any object code stored in memory space B, and likewise Core B cannot access any object code stored in memory space A.

If a function in shared memory space includes an undefined reference that can be satisfied by a function in more than one private space, the linker may not have the information necessary to resolve that undefined reference to a memory address, since the same symbol appears in two private spaces. This situation is depicted in FIG. 4.

Because the address ranges for memory space A and memory space B are nonoverlapping, the address of symbol z in this example will be different depending on whether the definition of symbol z in memory space A is used or the definition of symbol z in memory space B is used. The linker must resolve the symbolic reference to a single address to successfully build the application.

There are several options for the linker to resolve symbol z. The linker could resolve symbol z to the definition in Memory Space A. If a process is running in Core B, however, it will not be able to access the memory because all memory addresses in Memory Space A are only available to Core A. Similarly, if the linker resolves symbol z to the definition in Core B, the reference will be unavailable to a process running in Core A. The linker does not have the option of resolving the reference to both addresses, because the relocation must provide only a single address to be functional. Thus, there is a need for a system to resolve references so that an application can take advantage of the performance efficiencies of a multi-core architecture where some memory is private to each core.

3. Discussion of Related Art

One potential solution to this problem is known as a trampoline function. In this situation, the linker replaces the reference to the symbol that appears in both private memories with a placeholder function that selects the proper reference at runtime. Instead of referencing symbol z directly, the linker inserts a reference to a trampolin function. The function then determines at the time it is called which core is running the process and implements a second jump to symbol z in that core. This solution does not work in all circumstances, however. It is inappropriate for references to data (rather than code) since the data is read rather than executed by the processor. Moreover, it can result in decreased performance for the final application due to the additional steps involved.

Another possible solution is a run-time context switch in which the state of a CPU is saved and replaced with another state. A context switch is often used to allow multiple processes to share a single CPU resource. This solution is also inappropriate, however. In addition to being computationally intensive, it does not solve the linking problem when the two cores are executing in parallel.

Another approach used is simply to have the programmer manually resolve the problem in the code. There are two common manual approaches. The first approach is to map the shared reference (symbol y in FIG. 4) into each private memory. Thus, the shared symbol essentially becomes a private symbol to each core. If Core A calls symbol y, the linker will resolve that symbol to the definition in Memory Space A, and in turn resolve the reference in symbol y to symbol z in Memory Space A. Likewise, a reference from Core B to symbol y will stay within private Memory Space B. This approach is undesirable, however, because it consumes extra private memory space and requires additional work by the programmer. Often, the memory space private to each core will be the most expensive and smallest. It is thus undesirable to force the programmer to use that memory space when it is not necessary, and also results in more memory usage overall by duplicating the shared reference into two private memories.

Another manual approach that can be used is to map the two private symbols into a single symbol in shared memory. This approach also fails, however, if the private symbols are supposed to behave differently in each core and thus cannot be mapped to a single symbol. It is also undesirable if the private symbols were mapped to private memory for performance reasons.

SUMMARY OF INVENTION

This invention provides an automatic solution to the problem described above. The linker categorizes each reference that originates in shared memory according to whether the reference can be satisfied by more than one definition in private memory and whether the reference can be reached from more than one core. If a reference in shared memory meets both criteria, it is then duplicated in shared memory, so that each instance of code or data referring to a symbol in shared memory from private memory will refer to its own copy of that shared reference, which will then refer back to the proper reference in private memory from the core that originated the reference. The process provides an automatic solution to the problem described above, by duplicating symbols and references as necessary, until the private symbols in each core are referenced only by symbols in shared memory that are reachable from the same core.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
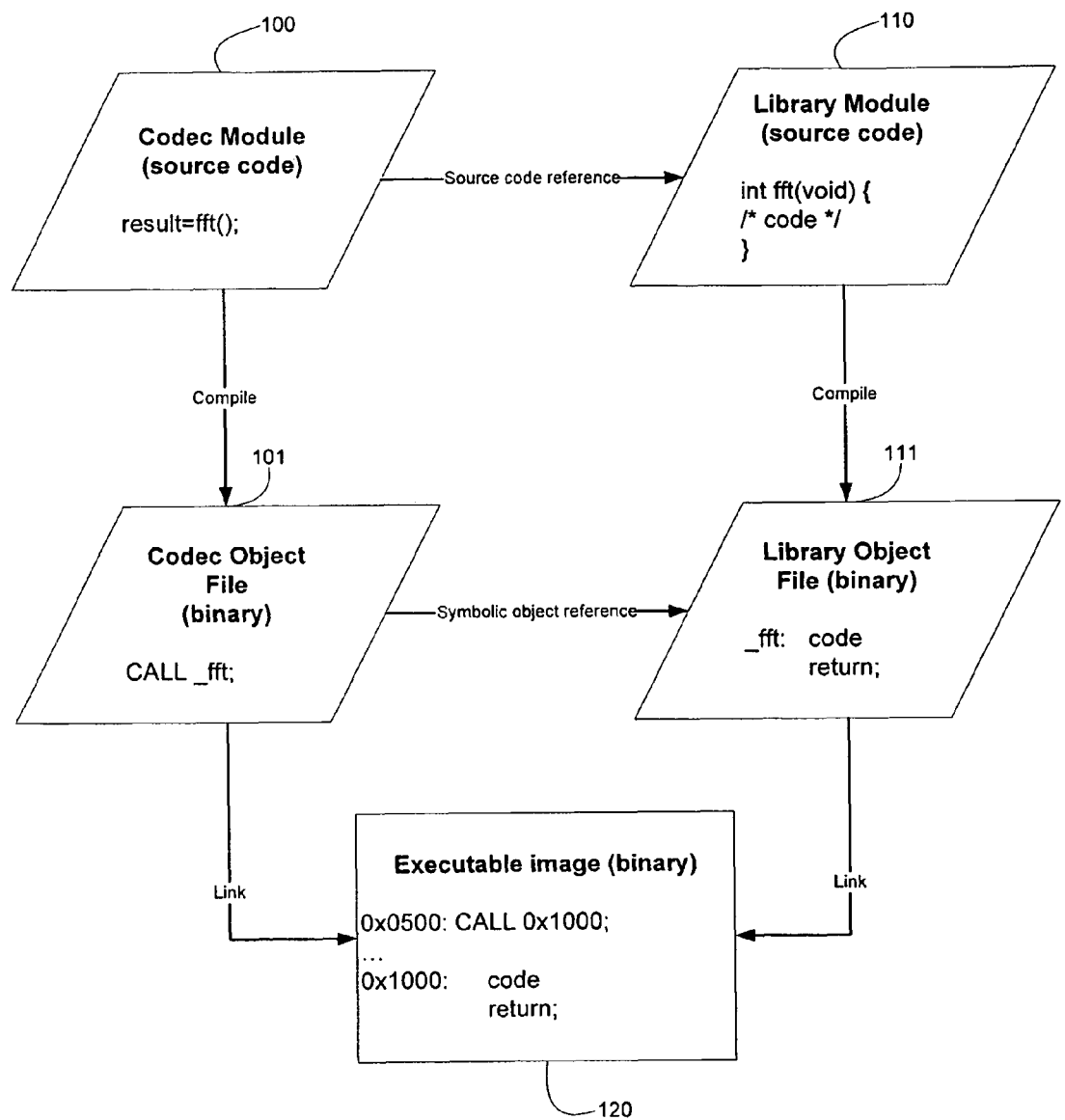
FIG. 1 is a general overview of the compiling and linking process.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 depicts the compiling and linking process as it is commonly used to build software applications. In this example, codec module 100 and library module 110 both represent source code files. The codec module 100 could be a component of a digital signal processing application that requires a Fast Fourier Transform function to complete its designated task. The codec module 100 thus includes a source code reference to the function fft( ), which is contained in a separate source code library module 110. The compiler translates the source code for the codec module 100 into an object file 101. Likewise, the library module 110 is compiled into an object file 111. At this point in the building process, the codec object file 101 has an unresolved symbolic reference _fft. That reference will be resolved to the definition for that reference in the library object file 111. The linker performs this resolution task and combines the two object files into a single binary executable image binary 120. The linker also locates the _fft reference in memory and converts all symbolic references to that function to a memory address. In the case of dynamic linking rather than static linking, the linker may not combine the files into a single executable but rather leave the reference unresolved until runtime. FIG. 1 is a greatly simplified example of the compiling and linking process, and those of ordinary skill in the art will readily appreciate that usually many more source code files are involved and different variations on the compiling and linking process are possible. Nothing in FIG. 1 is intended to be a limiting aspect of the invention.

Figure 2:
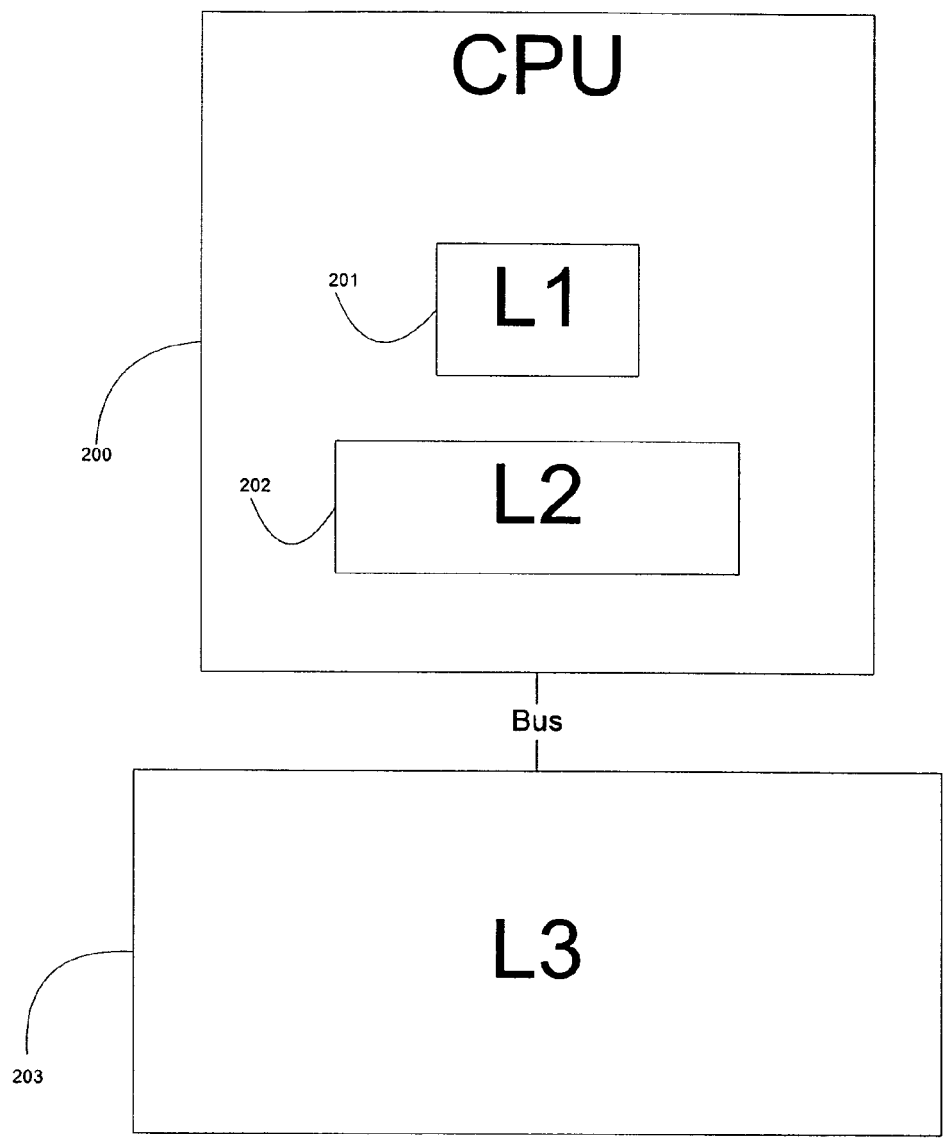
FIG. 2 is a schematic illustration of a CPU with two levels of internal memory cache and main memory accessible through a bus.

FIG. 2 presents an example of a CPU 200 with two levels of memory cache on the chip with the CPU. These levels are depicted as L1 201 and L2 202. The CPU is connected to main memory 203 by a bus. Ideally, the data and code that is accessed most often will be closest to the CPU at L1 201, followed by the data and code that is accessed less often at L2 202, with the remaining data and code being stored at L3 203. Again, one of ordinary skill in the art will appreciate that this is a greatly simplified representation of a CPU and multi-tiered memory and that many variations are possible, including any combination of: (1) more or fewer levels of memory storage; (2) more or fewer CPUs in a given machine; (3) more or fewer cores for each CPU (for example, the dual-core system depicted in FIG. 3). Nothing in FIG. 2 is intended to be a limiting aspect of the invention.

Figure 3:
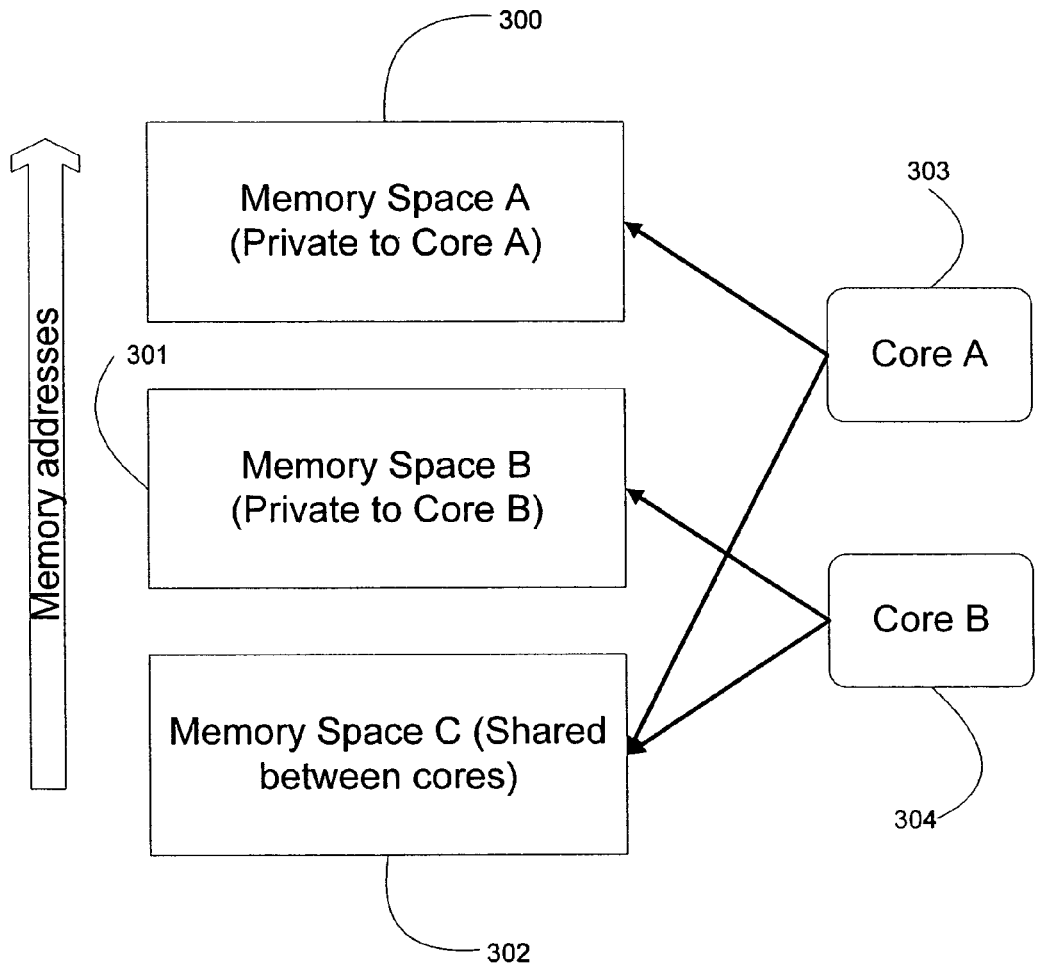
FIG. 3 is a schematic illustration of a dual core system where each core has its own private memory as well as another memory space that is shared by the cores.

FIG. 3 depicts a dual-core system with multiple private memory spaces. In this system, instructions can be run separately and in parallel on Core A 303 and Core B 304. Each core has a private memory space that may be closer to the core and thus faster to access. These private memory spaces are only accessible to their associated cores. Accordingly, Memory Space A 300 can only be accessed by Core A 303. Memory Space B 301 can only be accessed by Core B 304. There is also a shared Memory Space C 302 that can be accessed from both Core A 303 and Core B 304. This system can be generalized to any number of cores and any number of shared and private memory spaces. FIG. 3 also shows that the private and shared memory spaces are address using a consistent memory addressing scheme, and thus each memory location, whether in private or shared memory, has a unique address.

Figure 4:
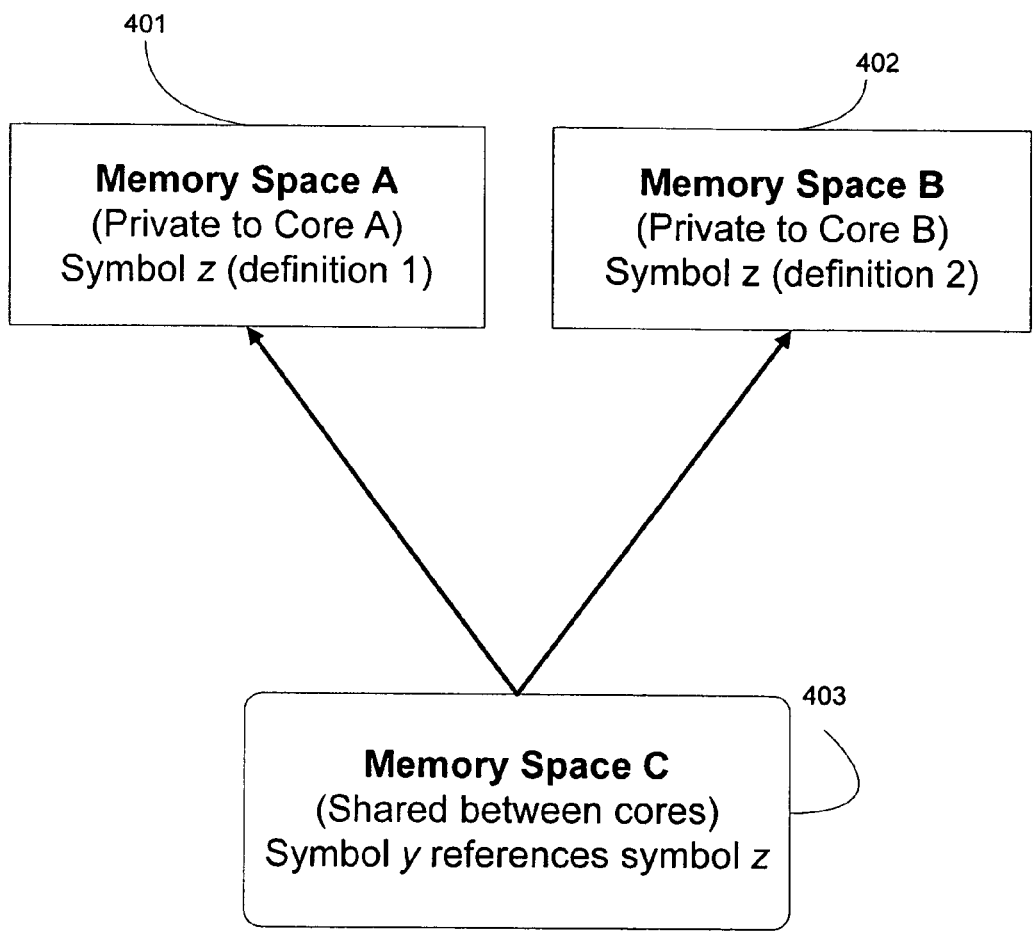
FIG. 4 is a schematic illustration of a symbol in shared memory that references a symbol that exists in two private memories.

FIG. 4 illustrates a situation that can arise in a multi-core system with private and shared memory spaces. FIG. 4 depicts three memory spaces. Memory Space A 401 and Memory Space B 402 are both private memory spaces. Thus, Memory Space A 401 can only be accessed by Core A 303. Similarly, Memory Space B 402 can only be accessed by Core B 304. Shared Memory Space C 403 can be accessed by both cores.

FIG. 4 also depicts symbol y in Memory Space C 403. Symbol y may be code or data. Symbol y includes a reference to another symbol z. According to FIG. 4, there are two separate definitions of symbol z, each in its own private memory space. The first definition of symbol z is shown in Memory Space A 401. The second definition of symbol z is shown in Memory Space B 402. If code running in Core A 303 calls symbol y in shared Memory Space C 403, the linker must resolve the reference in symbol y to symbol z. There are, however, two possible targets for resolving that reference, one in Memory Space A 401 and the other in Memory Space B 402. If the linker resolves the reference to the symbol in Memory Space B 402, Core A 303 will not be able to access that code or data, because it only has access to Memory Space A 401. It is one object of the invention to resolve this situation so that code can run on multiple cores without requiring the programmer to identify and resolve these sorts of conflicts manually.

Figure 5:
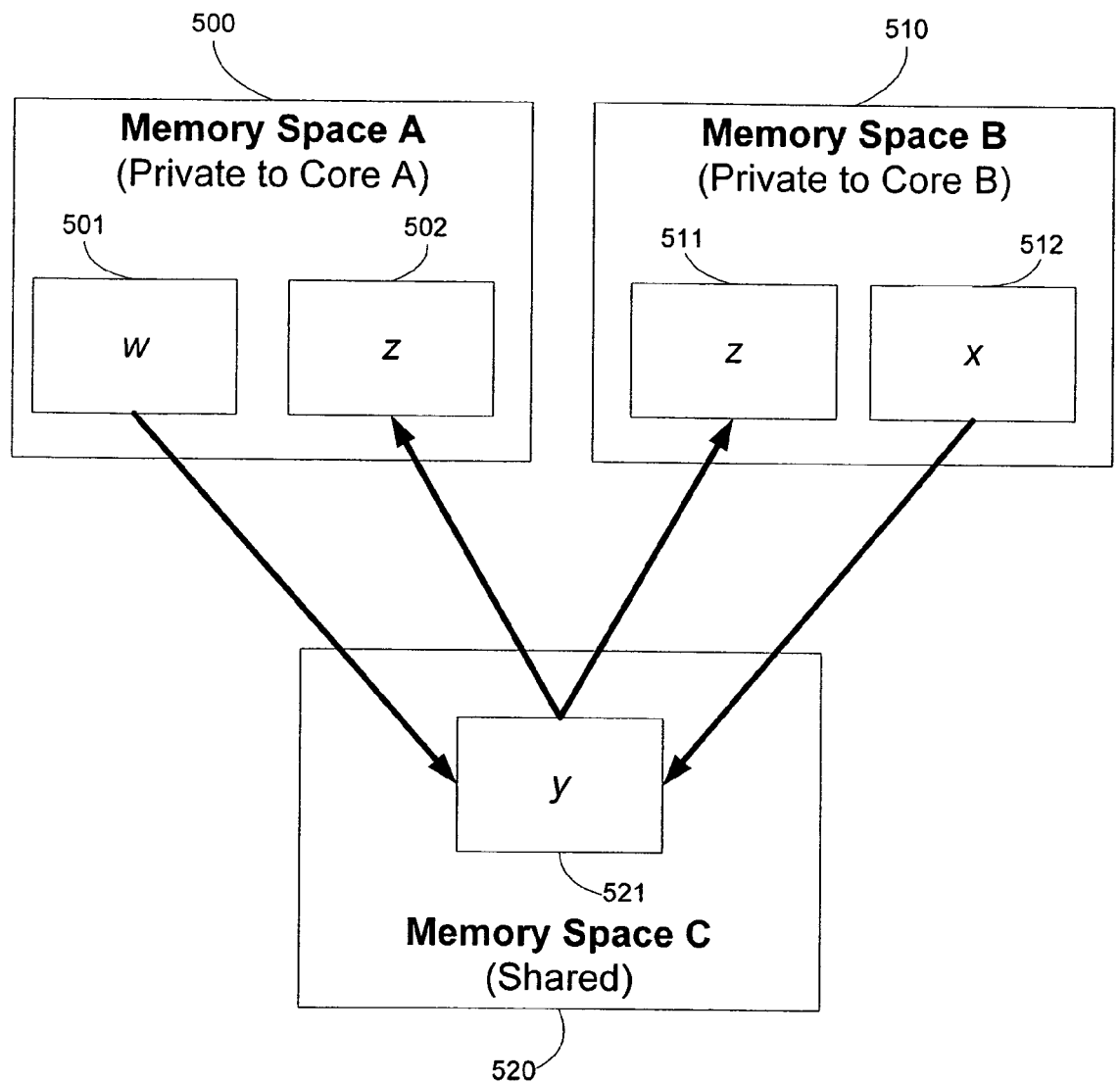
FIG. 5 is a schematic illustration of a chain of references from private memory to shared memory and back to private memory.

FIG. 5 depicts a set of references and memory spaces similar to FIG. 4. FIG. 5 thus shows a problem that one aspect of the invention may solve. As in FIG. 4, there are three memory spaces depicted in FIG. 5. These memory spaces are Memory Space A 500 that is only accessible to Core A 303; Memory Space B 510 that is only accessible to Core B 304; and Memory Space C 520 that is accessible to both cores. It will be readily appreciate by one of ordinary skill in the art that this schematic could be extended to include many more cores and/or memory spaces.

FIG. 5 also depicts several symbols and references between them. Symbol w 501 represents either code or data that is stored only in Memory Space A 500. Similarly, symbol x 512 represents either code or data that is stored only in Memory Space B 510. Both symbol w 501 and symbol x 512 contain references to symbol y 521 which is stored in Memory Space C 520. Thus, symbol y could be called or referenced either in the context of Memory Space A 500 and Core A 303 or in the context of Memory Space B 510 and Core B 304.

Symbol y 521 contains a reference to a symbol z that must be resolved by the linker. Both Memory Space A 500 and Memory Space B 510 contain private definitions for symbol z. In Memory Space A 500, the private definition for symbol z is shown at 502. In Memory Space B 510, the private definition for symbol z is shown at 511.

Because there are two private definitions for symbol z, the linker must take special action in accordance with a preferred embodiment of the invention to resolve the reference from symbol y 521 to one of the definitions of symbol z 502 and 511. If there were only one definition of symbol z and that were stored in shared memory 520, there would be no problem, as the linker could then resolve the reference from symbol y 521 to the reference to symbol z in shared memory 520 and the application would function correctly, as both Core A 303 and Core B 304 can access code and data stored in shared memory 520. If there were only one private definition for symbol z, the linker would have no option other than to resolve the reference to symbol z to that private definition. If, for example, symbol z were only defined in Memory Space A 500, the linker would have to resolve the reference from y 521 in shared Memory Space C 520 to the definition in Memory Space A 500, depicted at 502. In this instance, code running on Core B 304 would be unable to access the symbol, and thus an error should occur from reference x 512, because the chain of references from x 512 to y 521 to z 502 creates a situation where code or data is needed that is not accessible to the core seeking to resolve the reference. This aspect of the invention is thus particularly useful in the case depicted in FIG. 5 where a chain of references leads from a private symbol in one memory space to a symbol in a shared memory space and then back to another private symbol that can be resolved to two or more memory spaces. It will be readily appreciated by one of skill in the art that the solution disclosed here is equally applicable regardless of how many memory spaces or cores are used. It is also equally applicable for any length chain of references, and is not limited to the three symbol chain depicted in FIG. 5.

In order to resolve the potential conflict depicted in FIG. 5, the linker creates an internal representation of the application equivalent to a directed graph, where the nodes are symbol definitions and the links are symbol uses. Each node is categorized as private to one core or shared. The linker then applies a transformation to the graph that duplicates certain shared nodes and their links, so that no private node is reachable from another private node that is private to a different core.

This directed graph representation is analogous to a set of trees or branching structures, where the root of each structure is a separate core. Since each core in a multi-core architecture can run the application independently, a separate tree needs to be created for each core. The result, schematically, resembles a directed graph with a starting node for each core. Any reference from shared memory to multiple cores should be included in this directed graph in order to properly resolve the references.

According to this embodiment, the linker categorizes each reference to a symbol in private memory from a symbol in shared memory. Each reference can be categorized according to whether the reference can be satisfied by more than one private definition and whether the reference can be reached by more than one starting node.

If the reference from shared memory can only be satisfied by one private symbol, then there is no need for the linker to take additional steps. Either the shared symbol will be called by the core that includes the private symbol, in which case the application will run without problem, or the shared symbol will be called by another core, in which case the linker can generate an error.

Similarly, if the shared reference can only be reached from one core, the linker can simply resolve any references to symbols in private memory back to that core's memory.

If, however, the shared symbol is both called by the more than one core and can be satisfied by more than one private definition of the reference, then, according to this embodiment of the invention, the linker will duplicate the shared objects so that each shared reference called from a core will be resolved to a copy of that reference that resolves back to the definition of the private symbol in that core.

This embodiment of the invention can also be described in formal set notation as follows. Let $x \rightarrow y$ indicate that symbol x references symbol y directly. Also, let $x \leadsto y$ indicate that symbol x has a chain of references to symbol y. This chain of references could, in fact, be empty. Four examples of the chain from x to y ($x \leadsto y$) include:

1. x=y (symbol x is referencing itself)
2. $x \rightarrow y$ (symbol x references symbol y directly)
3. $x \rightarrow u$ and $u \rightarrow y$ (symbol x references symbol u, and symbol u references symbol y)
3. $x \rightarrow u$, $u \rightarrow v$, $v \rightarrow y$ (symbol x references symbol u, symbol u references symbol v, and symbol v references symbol y)

Let A be the set of symbols that is mapped to Memory Space A 500. Let B be the set of symbols that is mapped to Memory Space B 510. Let Sh be the set of symbols that is mapped to the shared Memory Space C 520. Let $start_A$ be the starting symbol for Core A 303. Let $start_B$ be the starting symbol for Core B 304.

Let $R_A$ be the set of symbols $\{x: start_A \leadsto x\}$, in other words, the set of symbols (data and code) reachable from $start_A$. Let $R_B$ be the set of symbols $\{x: start_B \leadsto x\}$, in other words, the set of symbols reachable from $start_B$.

Let P be the set of symbols:
$\{t \in Sh: \exists(a: a \in A \hat{} a \rightarrow t) \hat{} \exists(b: b \in B \hat{} b \rightarrow t) \hat{} \exists (u: t \leadsto u \hat{} u \in A \hat{} u \in B)\}$ In other words, P is the set of symbols in shared Memory Space C 520 referenced from possibly different symbols in both cores, and which can reach another symbol that is in both Core A 303 and Core B 304. Set P is the set of symbols that this embodiment of the invention will resolve to fix any conflicts.

Let D be the set of symbols:
$\{d \in Sh, d \in P: \exists(t,u: t \in P \hat{} u \in A \hat{} u \in B \hat{} t \leadsto d \hat{} d \leadsto)\}$ In other words, D is the set of symbols in shared memory that are reached on a path from a symbol in set P to a symbol in both core A 303 and Core B 304. These symbols in set D must be duplicated in order to fully resolve the symbols in set P that have been referenced.

Accordingly, for each symbol s in P∪D:
1. The linker will create two new symbols $S_A$ and $S_b$, both in shared Memory Space C 520.
2. For reference $x \rightarrow s$:
   a. If $x \in R_A$, replace with $x \rightarrow S_A$.
   b. If $x \in R_b$, replace with $x \rightarrow S_B$.
   c. Otherwise, x cannot be reached, and can be removed or replaced with $x \rightarrow S_A$ or $x \rightarrow S_B$.
3. For reference $s \rightarrow y$:
   a. If $y \in A$, replace with $S_A \rightarrow y$.
   b. If $y \in B$, replace with $S_B \rightarrow y$.
4. Symbol s can be removed, having been replaced by $S_A$ and $S_B$.

Figure 6:
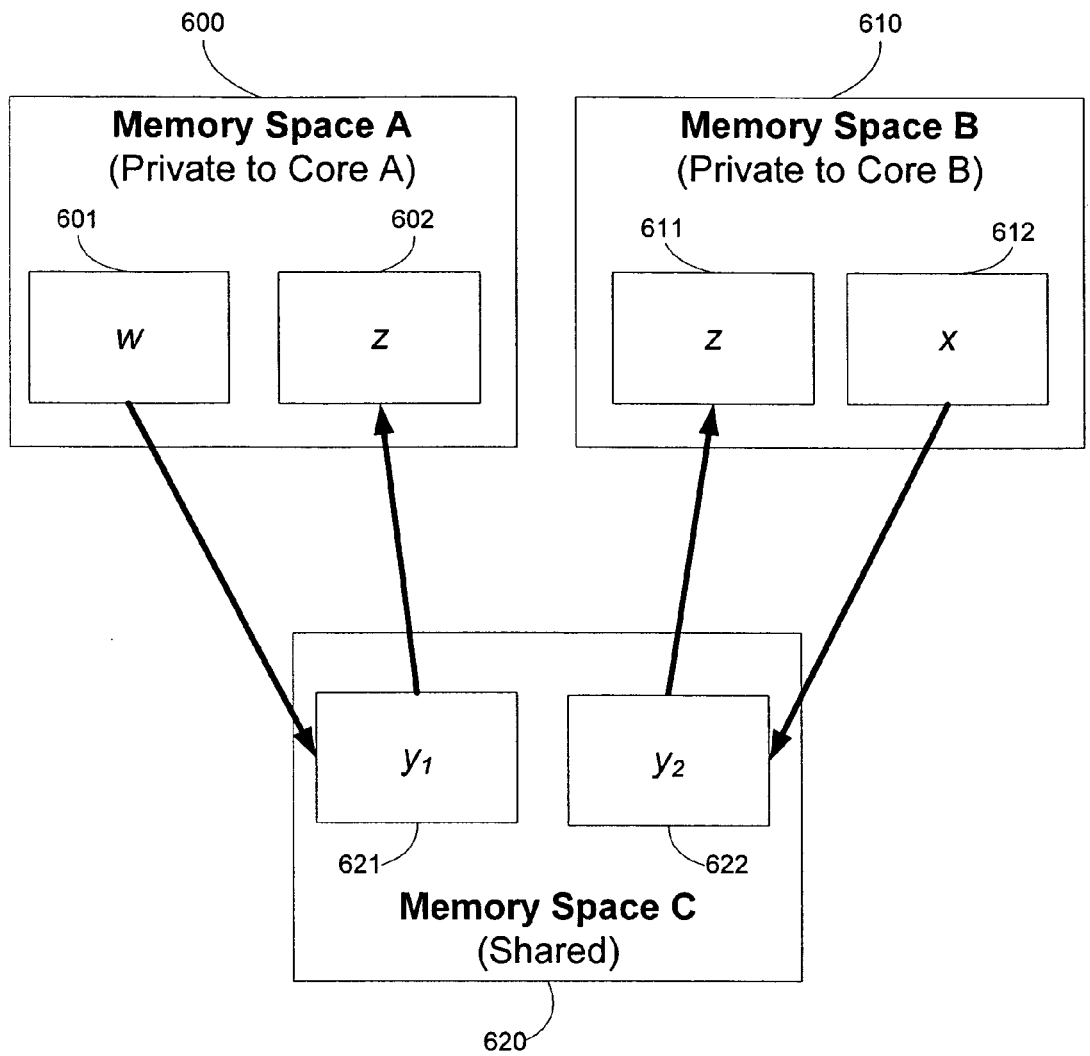
FIG. 6 is a schematic illustration of a symbol duplication and resolution in accordance with one aspect of the invention.

Once these steps have been performed for each symbol, all conflicts should be resolved. The result is depicted in FIG. 6. FIG. 6 illustrates the output of this embodiment of the invention on the symbols and references originally depicted in FIG. 5. FIG. 6 shows that the single symbol y 521 in shared Memory Space C 520 has been duplicated so that there are now two copies of the symbol: $y_1$ at 621 and $y_2$ at 622. Symbol w 601 in private Memory Space A 600 now references $y_1$ 621 in shared Memory Space C 620, and symbol x in private Memory Space B 610 now references $y_2$ in shared Memory Space C 620. Thus, each reference from a private memory refers to its own copy of symbol y 521. The reference in symbol $y_1$ 621 to symbol z has been resolved to refer to symbol z 602 in Memory Space A 600. Similarly, the reference in symbol $y_2$ 622 has been resolved to refer to symbol z 611 in Memory Space B 610. Thus, the resulting application will now function without conflict, since code running in Core A 303 will not need to access code or data running in Memory Space B 610, and code running in Core B 304 will not need to access code or data running in Memory Space A 600.

One of ordinary skill in the art will thus readily appreciate that this embodiment of the invention is easily extended to any number of cores or memory spaces. Further, the chain of references need not be limited to only three steps. According to the claimed method, any number of steps in the chain of references can still be resolved to insure that there will be no instance where code running in a core will need to access code or data stored in the private memory of another core.

According to another embodiment of the invention, the linker can identify chains of references between multiple cores that cannot be properly resolved. For example, for some reference chain x→y→z where x ∈ A∪B, y ∈ Sh, z ∈ A∪B, the following case may exist:

(x ∈ A, y ∈ Sh, z ∈ B: z ∈A)(x ∈ B, y ∈ Sh, z ∈ A:z ∈B).

In this example, the chain of references starts in one core, goes through shared memory, and then refers to a core other than the starting core. The linker may flag this chain as an error because it guarantees that one core will attempt to reference the other core's private memory.

There are cases where code and data are placed into shared memory because they are intended to be shared by multiple cores, and thus duplication of those symbols would be undesirable. For example, buffers used to share data and inter-process locking mechanisms should not be duplicated. Generally, the method for duplicating shared references will not apply to these sorts of references because they contain only data that does not reference other data. Thus, these sorts of references will not constitute the "shared" part of a private→shared→private chain, and so will not be categorized as a reference requiring duplication.

If, however, code or data in shared memory does reference code or data in private memory but should not be duplicated to work properly, a method describing in a co-pending application may be used. Such a case might occur, for example, with a global interrupt vector. According to an invention by the same inventors disclosed in a co-pending application entitled "File Attributes for Flexible Linking,"U.S. application Ser. No. 11/584,147, filed on Oct. 20, 2006, the corresponding object file is marked with a "file attribute" to indicate that the contents of the object file must be shared between multiple cores and thus that object must not be duplicated by the process disclosed here. During the linking process, the object file marked with the file attribute is excluded from the duplication process, and accordingly, if other conditions for duplication are met, a linking error should occur. Since the object must be shared, and since it references two private symbols, the programmer must then manually instruct the linker on how to resolve the conflict.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of preparing an executable program for a multi-core architecture from a plurality of object code modules, including a shared memory that is shared between multiple cores and a plurality of private memories, each of which is private to a core, the method comprising:
   identifying a shared symbol disposed in the shared memory that is (i) satisfied by multiple definitions disposed in the plurality of private memories and (ii) referenced by a plurality of cores in the multi-core architecture; and
   duplicating, for each referencing core, the identified symbol in the shared memory,
   wherein each of the duplicated symbols resolves to symbols stored only in the private memory of the core referencing the duplicated symbol, wherein identifying the shared symbols comprises (i) providing a representation of the executable program as a directed graph comprising nodes and links, wherein the nodes are symbol definitions and the links are symbol uses and (ii) categorizing each node as either private to one core or shared between cores, and wherein duplicating the identified symbols comprises transforming the graph to duplicate shared nodes and their links such that no private node is reachable from another private node that is private to a different core.

2. The method of claim 1, wherein the object code modules are created with a compiler.

3. The method of claim 1, wherein the object code modules are created with an assembler.

4. The method of claim 1, wherein the method is performed with a linker.

5. The method of claim 1, wherein the multi-core architecture has two cores.

6. The method of claim 1, wherein the multi-core architecture has more than two cores.

7. The method of claim 1, wherein the object code modules include application object code modules and library object code modules.

8. The method of claim 1, further comprising generating an error message if the graph cannot be transformed such that no private node is reachable from another private node that is private to a different core.

9. The method of claim 1, further comprising:
   providing an error message for each of said references that can be resolved only to a private symbol in private memory that is different from the private memory from which said reference is referenced.

10. The method of claim 1, wherein the cores have direct access to the shared memory.

11. A linker for linking a plurality of object code modules into at least one executable file, wherein the executable file can be executed by a CPU comprising a shared memory and a plurality of cores, each core having a private memory, the linker comprising:
   an identifying module for identifying each reference to a private symbol intended for use in private memory from a shared symbol in the shared memory that (i) can be satisfied by more than one definition in private memory and (ii) can be referenced from more than one core;
   a duplication module for duplicating, in the shared memory, each reference identified by said identifying module, the duplication module resolving symbols in each of said references such that each reference to a symbol in a private memory is resolved to the instance of that private symbol in the private memory of the core that referenced said shared symbol; and
   an output module for writing the at least one executable file, linked in accordance with the duplicated references, to a storage device,
   wherein identifying each reference identified by said identifying module comprises (i) providing a representation of the executable file as a directed graph comprising nodes and links, wherein the nodes are symbol definitions and the links are symbol uses and (ii) categorizing each node as either private to one core or shared between cores and wherein duplicating each reference comprises transforming the graph to duplicate shared nodes and their links such that no private node is reachable from another private node that is private to a different core.

12. The linker of claim 11, wherein the executable file can be executed by a CPU containing two cores.

13. The linker of claim 11, wherein the executable file can be executed by a CPU containing more than two cores.

14. The linker of claim 11, wherein the executable file can be executed by a CPU containing a plurality of cores wherein each core of the CPU contains memory that is not accessible to any other core of the CPU.

15. The linker of claim 11, wherein the cores have direct access to the shared memory.

* * * * *